US005703463A

United States Patent [19]
Smith

[11] Patent Number: 5,703,463
[45] Date of Patent: Dec. 30, 1997

[54] METHODS AND APPARATUS FOR PROTECTING BATTERY CELLS FROM OVERCHARGE

[75] Inventor: Gregory J. Smith, Tucson, Ariz.

[73] Assignee: National Semiconductor Corporation, Santa Clara, Calif.

[21] Appl. No.: 801,162

[22] Filed: Feb. 18, 1997

[51] Int. Cl.$^6$ .................................................. H01M 10/46
[52] U.S. Cl. ............................... 320/13; 320/30; 320/39
[58] Field of Search ........................... 320/5, 13, 21, 320/27, 28, 30, 32, 37, 39, 48, 49; 361/78, 86, 91, 104, 105

[56] References Cited

U.S. PATENT DOCUMENTS

| | | | |
|---|---|---|---|
| 4,467,266 | 8/1984 | Ritchie | 320/40 |
| 4,563,628 | 1/1986 | Tietz et al. | 320/20 |
| 5,315,221 | 5/1994 | Corey | 318/434 |
| 5,469,351 | 11/1995 | Masrur et al. | 363/56 |
| 5,526,215 | 6/1996 | Higashijima et al. | 361/86 |
| 5,602,460 | 2/1997 | Fernandez et al. | 320/30 |
| 5,637,413 | 6/1997 | Fernandez et al. | 320/39 X |

FOREIGN PATENT DOCUMENTS 8-227730  9/1996  Japan.

*Primary Examiner*—Edward Tso
*Attorney, Agent, or Firm*—Limbach & Limbach L.L.P.

[57] ABSTRACT

A method and apparatus for protecting at least one battery cell from overcharge utilizes a combination of at least one MOSFET switch and a separate fail-safe element such as a fuse or circuit breaker. The potential across the at least one battery cell is monitored to determine to determine whether a failure of the at the least one MOSFET switch has occurred, and in response to the determination of such a failure, a separate element such as a fuse is forced to open circuit to further disconnect the at least one battery cell from a charging current.

53 Claims, 8 Drawing Sheets

METHODS AND APPARATUS FOR PROTECTING BATTERY CELLS FROM OVERCHARGE

BACKGROUND OF THE INVENTION

1. Field of the Invention

The present invention relates generally to battery cell charging, and in particular to methods and apparatus for protecting battery cells from overcharge.

2. Description of the Related Art

Lithium and lithium-ion secondary (rechargeable) battery cells require protection from prolonged overcharging to prevent degradation of the cells' performance and to prevent the possibility of rupture of the cells' case and potential combustion of the cells' electrolyte. Power MOSFET (metal-oxide-silicon field effect transistor) switches in series with the cell's current path are commonly used to disconnect cells from chargers that fail to terminate cell charging within specified voltage limits. Such MOSFET switches are typically driven from protection circuits internal to a battery pack which houses the cells, where the protection circuits monitor individual cell voltages for an overcharge condition.

Provided the MOSFET switches can reliably open the circuit at the onset of overcharge, the cells are protected. There are, however, at least two reasons why such MOSFET switches could fail to open the circuit and thereby allow overcharge. First, if a charger is applied to the battery pack where the charger provides a voltage in excess of the drain to source breakdown voltage of the MOSFETs ($BV_{dss}$), the MOSFETs will break down and be unable to open the circuit, thereby allowing the cells to become dangerously overcharged. Second, is the finite potential for drain to source short circuits (even for properly rated MOSFETs) following numerous high current transient loads. Such transients could, for example, be those normal surge currents that occur when reactive loads are initially powered by the cells. Should such a rare event occur, the shorted MOSFETs would fail to turn off (open circuit) as required to protect the cells from chargers that provide a voltage outside a rated compliance voltage.

Thus, it would be desirable to provide a method and apparatus which more fully protects secondary battery cells from prolonged overcharging.

SUMMARY OF THE INVENTION

It is an object of the invention to provide a method and apparatus for protecting secondary battery cells, such as lithium and lithium-ion cells, from prolonged overcharging.

It is a further object of the invention to provide a method and apparatus for detecting the onset of prolonged overcharging of secondary battery cells such as lithium and lithium-ion cells.

It is a feature of the invention to first detect a first cell voltage level which, if such level exists for a first predetermined period, is utilized to turn off MOSFET switches within a charging circuit to thereby disconnect cells from a charging current.

It is a further feature of the invention to also detect a second cell voltage level, where the second cell voltage level is greater than the first cell voltage level. If this second cell voltage level exists for a second predetermined period, a protection circuit is activated to disconnect cells from a charging current.

It is yet another feature of the invention that when the second cell voltage level exists for a second predetermined period and the protection circuit is activated, following disconnection of the cells, reconnection of the cells is not automatic.

It is an advantage of the invention to increase the level of protection from cell overcharge.

It is a further advantage of the invention to detect failure of a first disconnect circuit and to alternatively disconnect cells prior to a possible chemically unstable state of the cells.

According to one aspect of the invention, there is provided a method of protecting at least one rechargeable battery cell from overcharge, including the steps of monitoring an output potential provided to a pair of output nodes, the output potential representative of a potential across the at least one rechargeable battery cell, and if the output potential exceeds a first predetermined value for at least a first predetermined period, decoupling the at least one rechargeable battery cell and one of the output nodes, and monitoring the output potential, and if the output potential exceeds a second predetermined value, decoupling the at least one rechargeable battery cell from at least one of the output nodes.

According to another aspect of the invention, an apparatus for protecting at least one rechargeable battery cell from overcharge, includes a comparator for monitoring an output potential provided to a pair of output nodes, the output potential representative of a potential across the at least one rechargeable battery cell, a logic circuit responsive to an output of the comparator for biasing into non-conduction at least one switching element coupled between the at least one rechargeable battery cell and one of the output nodes if the output potential exceeds a first predetermined value for at least a first predetermined period and a decoupling circuit driven by the logic circuit for decoupling the at least one rechargeable battery cell from at least one of the output nodes if the output potential exceeds a second predetermined value.

These and other objects, features and advantages will become apparent when considered with reference to the following description and the accompanying drawings, where like reference numerals refer to like elements.

DETAILED DESCRIPTION OF THE PREFERRED EMBODIMENTS

Figure 1:
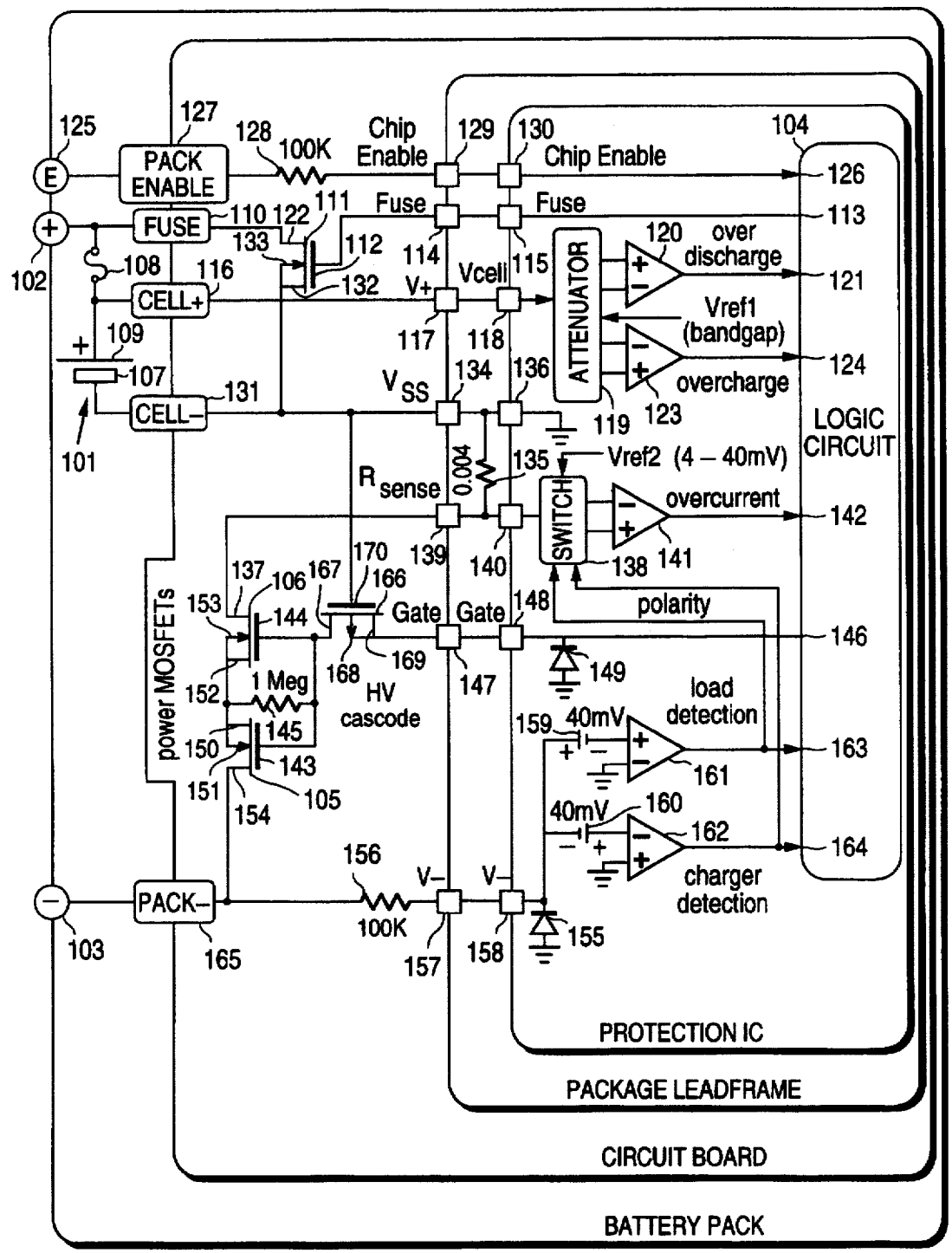
FIG. 1 is a block and schematic diagram of a battery pack which incorporates a preferred embodiment of the invention.

Referring to FIG. 1, a circuit 100 for protecting secondary cells from overcharge is shown. Circuit 100 is typically referred to as a "battery pack" since it contains a secondary cell 101, a positive (+) output 102 and a negative (−) output 103. Secondary cell 101, in the preferred embodiment of the invention is a lithium ion or lithium cell. The invention is, however, applicable to other types of rechargeable cells. Outputs 102 and 103, when connected, are connected to a charger circuit (not shown) or to a device (not shown) which is to be powered by battery pack 100. It is to be understood that although cell 101 is represented in FIG. 1 as a single cell, cell 101 may be in the form of series and parallel combinations of individual cells. In such a case, however, such a cell 101 would be required to provide a potential and current output sufficient to power both the circuitry within battery pack 100 as well as a load to which battery pack 100 is connected. Preferably in the case of multiple cells, each cell is connected to its own circuitry as shown in FIG. 1, since defects in individual cells, which would be apparent when measuring each single cell voltage, may be masked by series combinations of such cells. It is to be understood that parallel connected cells can be considered to operate as a single cell.

The circuit of battery pack 100 includes a logic circuit 104, which is more fully described below, a pair of MOSFETs 105 and 106, which selectively couple a negative terminal 107 of secondary cell 101 to negative (−) output 103. In the preferred embodiment of the invention, the MOSFETs 105 and 106 are enhancement mode devices and are coupled source-to-source. It is to be understood, however, that MOSFETs 105 and 106 may alternatively be coupled with a drain-to-drain configuration, with one source connected to the negative (−) output terminal 103 and the other source connected to negative terminal 107 of cell 101. With such an arrangement, as more fully described below with reference to FIG. 7, gate drive to MOSFETs 105 AND 106 is independent, rather than coupled as in the case of the embodiment of FIG. 1. In the preferred embodiments of the invention, the potential across the gates 143 and 144 and sources 150 and 152, $V_{gs}$, of MOSFETs 105 and 106, respectively, should be zero in order to decouple cell 101 from negative (−) output terminal 103. Battery pack 100 also includes a fusible element 108 which couples a positive terminal 109 of cell 101 to the junction of the positive (+) output 102 and a fuse terminal 110.

A MOSFET 111 has its gate 112 coupled to an output 113 of logic circuit 104 through a pair of fuse terminals 114 and 115. A drain 122 of MOSFET 111 is coupled to fuse terminal 110. The junction of cell 101's positive terminal 109 and fusible element 108 is coupled through a cell+ terminal 116, a V+ terminal 117 and a Vcell terminal 118 to an input of an attenuator 119. Either a switched capacitor attenuator or a resistive divider may be utilized as attenuator 119. A comparator 120 has both its non-inverting and inverting inputs coupled to outputs of attenuator 119. An output of comparator 120 provides an overdischarge signal to an input 121 of logic circuit 104.

Attenuator 119 is provided a bandgap reference potential Vref1 though a second input. Inverting and non-inverting inputs of a comparator 123 are coupled to outputs of attenuator 119. An output of comparator 123 provides an overcharge signal to an input 124 of logic circuit 104.

An enable terminal 125, which interfaces with a load and/or charger is coupled to an input 126 of logic circuit 104 through a pack enable terminal 127, a 100K ohm resistor 128, a chip enable terminal 129 and a terminal 130.

A cell-terminal 131 is coupled to the junction of a source 132, a substrate 133 (both of MOSFET 112), and a $V_{SS}$ terminal 134. $V_{SS}$ terminal 134 is coupled to the junction of ground or common, a 0.004 ohm sense resistor 135 and a terminal 136.

A drain 137 of MOSFET 106 is coupled to a switch 138 through an RSENSE terminal 139 and a terminal 140 and to sense resistor 135. A reference potential Vref2, having a value of from 4 to 40 millivolts, is provided to an input of switch 138. A comparator 141 compares outputs of switch 138 to generate an overcurrent signal which is provided to an input 142 of logic circuit 104.

The junction of a gate 143 of MOSFET 105, a gate 144 of MOSFET 106 and a 1 Meg ohm resistor 145 are coupled to an output 146 of logic circuit 104 through a PMOSFET 166, a gate terminal 147 and a gate terminal 148. In further detail, the junction of a gate 143 of MOSFET 105, a gate 144 of MOSFET 106 and a 1 Meg ohm resistor 145 are coupled to a drain 167. A substrate terminal 168 and a source 169 are coupled to gate terminal 147. A gate 170 is coupled to the junction of CELL- terminal 131 and $V_{SS}$ terminal 134. A diode 149 is coupled between output 146 and common or ground. In the preferred embodiment of the invention, diode 149 is a parasitic substrate diode. The other end of resistor 145 is coupled to the junction of a source 150 and a substrate 151 (both of MOSFET 105) and a source 152 and a substrate 153 (both of MOSFET 106). A drain 154 of MOSFET 105 is coupled to the cathode of a substrate diode 155, a V-terminal 157 and a V-terminal 158, all through a resistor 156.

The cathode of diode 155 is coupled to the junction of a positive terminal of a first 40 millivolt voltage source 159 and a negative terminal of a second 40 millivolt voltage source 160. The negative terminal of voltage source 159 is coupled to a non-inverting input of comparator 161, while the positive terminal of voltage source 160 is coupled, to the inverting input of comparator 162. An inverting input of comparator 161 is coupled to ground or common. A non-inverting input of comparator 162 is coupled to ground or common.

An output of comparator 161 is provided to an input 163 of logic circuit 104 and to a polarity input of switch 138. An output of comparator 162 is provided to an input 164 of logic circuit 104 and to a polarity input of switch 138.

The negative (−) output terminal 103 is coupled to the junction of source 154 and resistor 156 through a pack-terminal 165.

In operation, battery pack 100 utilizes dual forms of overcharge protection, specifically primary protection provided by MOSFETs 105 and 106, and secondary protection provided by fusible element 108. It is to be understood that fusible element 108 may be a single use fuse, or alternatively, may be a circuit breaker type of device, which, if desirable, may be reset by a user or alternatively by an authorized repair station. Alternatively, fusible element 108 may be a self resetting positive temperature coefficient ("PTC") fuse. Furthermore, as described further herein with respect to alternative embodiments of the invention, the fusible element may consist of two separate elements, or a thermal fuse (for example, a wax ball fuse) which relies upon heater elements to decouple.

During a normal recharge operation, battery pack 100 is connected to an appropriate recharger through the positive (+) output 102 and the negative (−) output 103. Such a recharger must be configured to provide a current and voltage at a rate and time appropriate for a lithium or lithium-ion cell. An appropriate charger for a lithium ion cell will, ideally at the end of a charging cycle, charge the lithium ion cell such that the cell voltage at termination of the charging cycle will be a preselected compliance voltage, CV. If a user were, however, to attempt to recharge battery pack 100 with a charger designed to recharge nickel cadmium batteries where the compliance voltage exceeds the maximum value for a lithium ion cell, battery pack 100 would, as explained below, sense the overcharge condition thereby resulting, and would operate to disconnect cell 101 from at least one of terminals 102 and 103.

In further detail, battery pack 100 is depicted in FIG. 1 as an assembled set of components or subassemblies. More particularly, battery pack 100 consists of an integrated circuit, a package leadframe, a circuit board and components thereon, and an external housing which provides terminals for interfacing the battery pack 100 with a load or a charger. The battery pack 100 contains three significant blocks, a cell voltage detection block, a battery pack current detection block and a load/charger detection block. The cell voltage detection block consists of attenuator 119 and comparators 120 and 123. Together these elements detect over discharge or overcharge by sensing the potential directly across cell 101. The battery pack current detection block consists of the switch 138 and comparator 141. Together these elements sense the voltage drop across sense resistor 135, and if a sufficient potential is detected across such sense resistor 135, an overcurrent condition is indicated, and the output of comparator 141 so indicates. In the preferred embodiment of the invention, sense resistor 135 is external to the integrated circuit, but instead is part of the package leadframe. A suitable leadframe for use with the present invention is described in U.S. Pat. No. 5,534,788, which patent is incorporated herein by reference.

The load/charger detection block consists of comparators 161 and 162 together with parasitic diode 155 and voltage sources 159 and 160. Comparators 161 and 162 operate to determine if the external operation conditions of battery pack 100 are proper for returning MOSFETs 105 and 106 to conduction mode (on) after a fault has occurred. For example, logic circuit 104 turns off MOSFETs 105 and 106 by removing, through PMOSFET 166, pull-up current from gates 143 and 144 due to detection of an overcharge condition, MOSFETs 105 and 106 will remain non-conductive unless there exists a method to return them to a conductive state. In this case, it is desirable to have a load which applied or coupled to battery pack 100, return MOSFETs 105 and 106 back to a conductive state. A determination that a load has been attached to battery pack 100 is possible because of the load/charger detection block. Similarly, automatic recovery of an over-discharged battery pack 100 (i.e., an under-voltage cell) is possible because the load/charger detection block signals the presence of a charger and instructs logic circuit 104 to provide gate drive to gates 143 and 144. Finally, if an overcurrent event caused MOSFETs 105 and 106 to become non-conductive, the load/charger detection block is able to determine that the voltage across MOSFETs 105 and 106 is zero, this being indicative of battery pack 100 being detached from the source of the overcurrent event.

PMOSFET 166 operates to isolate high potentials from components which are part of the protection IC when MOSFETS 105 and 106 are off and a charger is applied to battery pack 100. Those components of the protection IC include logic circuit 104, attenuator 119, comparators 120, 123, 141, 161 and 162, switch 138 and diodes 149 and 155. In operation, gate terminal 148 cannot be pulled below $V_{SS}$ without forwarding biasing the substrate diode 149. When the drive at gate terminal 148 is tri-state or high impedance, PMOSFET 166 is off and MOSFETs 105 and 106 are off. In such a case, the potential at drain 167 of PMOSFET 166 is equal to the potential at negative (−) output terminal 103, which in the case of an illegal charger could be a very large magnitude. Source 169 of PMOSFET 166 appears as a high impedance, so gate terminal 148 is not significantly loaded.

When the potential of gates 143 and 144 is equal to that at V+ terminal 117 (an on state for MOSFETS 105 and 106), then the potential at the source 169 and the drain 167 of PMOSFET 166 is also equal to the potential at the $V_{SS}$ terminal 134. Although in the preferred embodiment of the invention transistor 166 is a PMOSFET, a PNP bipolar transistor may also be utilized, where the emitter corresponds to source 169, the collector corresponds to drain 167 and the base is coupled to $V_{SS}$ terminal 134 through a resistance of greater than 1 MEG ohms. In this embodiment of the invention, a resistance of 4.7 Meg ohm has been found to be suitable.

Logic circuit 104 contains finite state machines for protection and recovery algorithms, timers and built-in test circuitry. Also contained in logic circuit 104 is an EEPROM trim register and the system clock.

In the preferred embodiment of the invention, battery pack 100 includes a printed circuit board and a single lithium ion cell 101. Cell 101 is typically connected to the printed circuit board by metal strips that are welded to the cell's terminals and then soldered to the circuit board.

Figure 2:
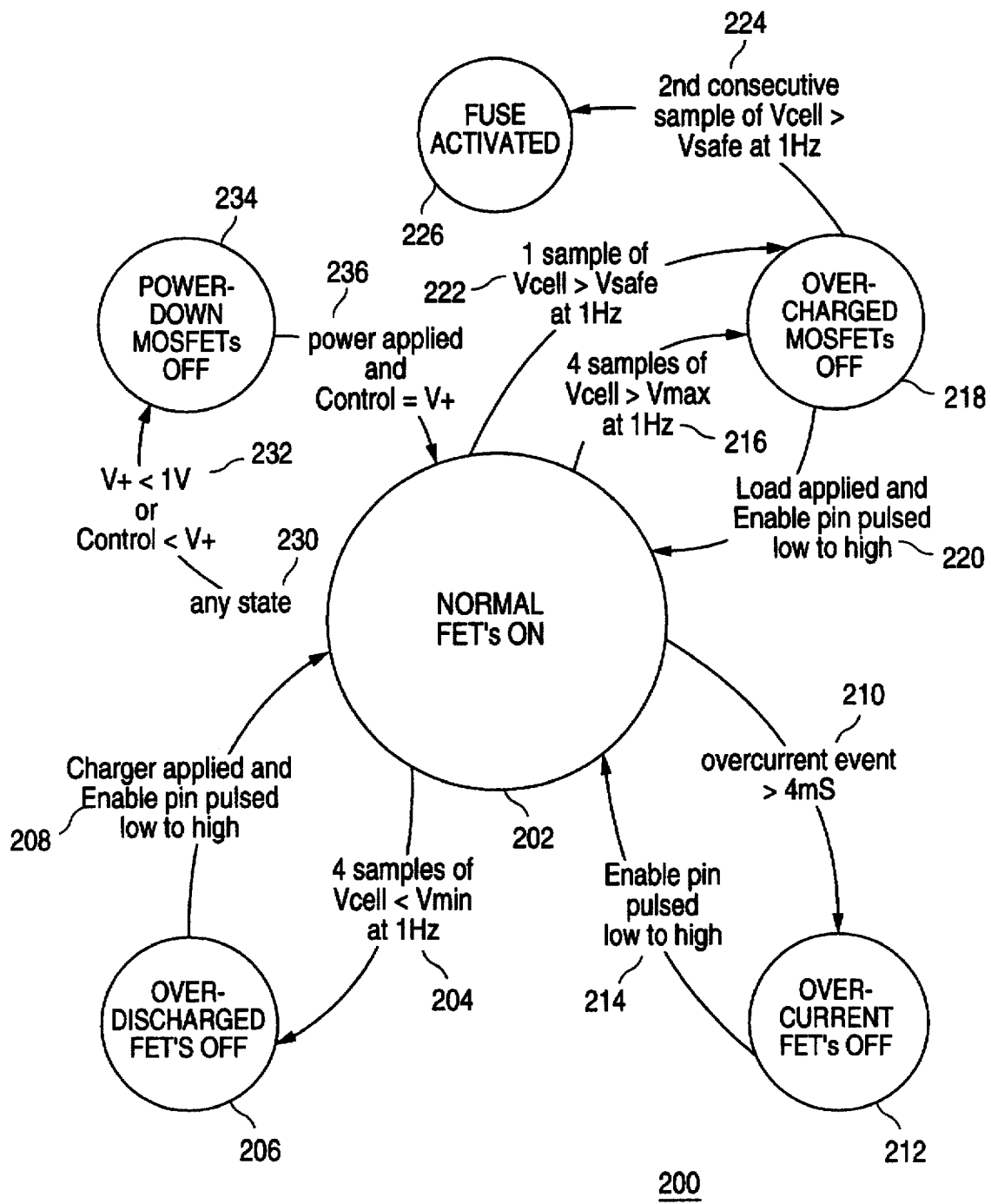
FIG. 2 is a state diagram for the logic circuit as utilized with the overcharge protection circuit of FIG. 1.

Referring now to FIG. 2, a state diagram 200 for battery pack 100 is illustrated. Assuming that a potential has been applied to enable terminal 125, during normal recharging and during discharge (i.e., the supply of power from the battery pack to a device such as a cellular telephone or laptop computer), the gate terminal 147 biases gates 143 and 144 such that MOSFETs 105 and 106 become conductive as indicated in state 202. Enable terminal 125 is utilized to help prevent, through the use of this third battery pack terminal, the recharge and/or discharge of battery pack 100 by an unauthorized device, such as a recharger designed to recharge nickel-cadmium secondary cells. Enable terminal 125 also helps prevent accidental discharge by way of an external short circuit across output terminals 102 and 103 when battery pack 100 is not coupled to a valid load or to a valid charger.

Logic circuit 104, through the V+ terminal 117 and the $V_{ss}$ terminal 134 monitors the voltage $V_{cell}$ at cell terminals 169 and 107. Such monitoring is provided through periodic sampling, although other monitoring techniques, such as continuous monitoring may be utilized. In addition, logic circuit 104 monitors the voltage across MOSFETs 105 and 106 by monitoring the difference between the potential at V-terminal 157 and the potential at Rsense terminal 139.

When battery pack 100 is in a discharge mode, i.e., supplying power to a load, MOSFETS 105 and 106 are provided a low resistance conduction path between negative terminal 107 of cell 101 and negative output terminal 103. This state is indicated at 202. In the preferred embodiment of the invention the logic circuit samples, at a frequency of 1 Hz, the potential across CELL+ terminal 116 and CELL− terminal 131. As is clear from FIG. 1, the potential at CELL+ terminal 116 is the same as at V+ terminal 117 and at Vcell terminal 118. Similarly, the potential at CELL− terminal 131 is the same as the potential at $V_{SS}$ terminal 134 and terminal 136. Transition 204 indicates overdischarge, which is sampled at a frequency of 1 Hz. Sampling also occurs at a frequency of 1 Hz during the other states and transitions of FIG. 2. If at least a predetermined period, which in the preferred embodiment of the invention is 4 consecutive samples of $V_{cell}$ are less than a predetermined minimum voltage $V_{min}$, MOSFETs 105 and 106 are, through their respective gates 143 and 144, turned off to prevent further discharge of and possible damage to cell 101. A lithium ion cell, for example, suffers corrosion of its internal current collector in an undervoltage condition, thereby reducing the life cycle of such cell. This state is indicated at 206. In normal use, battery pack 100 is then connected to or placed within a charger (not shown), such that enable pin 125 is changed from low to high (indicated at transition 208), thereby turning on MOSFETS 105 and 106, thereby returning to state 202.

If the charger provides battery pack 100 an amount of current greater than a predetermined amount, which amount is based upon the number of cells (in cell 101) their series/parallel configurations, and such overcurrent condition lasts for at least 4 milliseconds as shown at transition 210, logic circuit 104 turns off MOSFETs 105 and 106 through their respective gates 143 and 144. This state is shown at 212. Operating on the assumption that such overcurrent is a transient condition, recovery is automatic in the case where the potential across MOSFETs 105 and 106, $V_{MOSFET}$=0, thereby indicating no load or no charge. Recovery also occurs where an external enable reset has been provided to enable terminal 125 thereby turning on MOSFETS 105 and 106, returning such MOSFETs to state 202.

Starting again from state 202, if battery pack 100 is connected to a charger, logic circuit 104 through terminals 117 and 134, determines whether $V_{cell}$ is greater than a predetermined maximum voltage $V_{max}$. More specifically, $V_{cell}$ is sampled at a frequency of 1 Hz, and if at least 4 consecutive samples indicate that $V_{cell}$ is greater than $V_{max}$, logic circuit 104, through gate terminal 147 turns off MOSFETs 105 and 106, through their respective gates 143 and 144. This transition is indicated at 216. This turned-off state is indicated at 218. Such a condition essentially indicates that cell 101 is fully charged and ready to power a load. Cell 101 is thus isolated from a charger, but cell 101 can be discharged by a load. Therefore, as indicated at 220, if a load is applied, and enable pin 125 is changed from low to high or a load is detected at V- terminal 157, MOSFETs 105 and 106 are thereby turned on, returning to state 202.

Logic circuit 104 through terminals $V_{SS}$ terminal 134 and V+ terminal 117 senses, at a frequency of 1 Hz, the potential across cell terminals 107 and 109. If $V_{cell}$ is greater than a predetermined "safe" potential $V_{safe}$, where $V_{safe}$ is greater than $V_{max}$, MOSFETs 105 and 106 are immediately turned off. This condition could occur if a high current charger were applied to battery pack 100, thereby forcing the potential across cell 101 to exceed both $V_{max}$ and $V_{safe}$ (in less than the 4 samples required in transition 216).

As indicated above, although unlikely, it is possible that both MOSFETs 105 and 106 will remain conductive between their respective drains and sources, notwithstanding the lack of drive at their respective gates 143 and 144. In such an event, even if no drive is applied to gates 143 and 144 from gate terminal 147, MOSFETs 105 and 106 remain conductive, thereby permitting continued overcharging when battery pack 100 is connected to a charger. In order to prevent overheating, rupture and a possible ignition of cell 101.

However, the potential across cell 101 should not exceed $V_{safe}$ for a second consecutive period. In such an event, this would indicate that MOSFETs 105 and 106 continue to be conductive, and with a charger still connected to battery pack 100, cell 101 will continue to be overcharged as indicated at transition 224. In such an instance, logic circuit 104 provides a signal to gate 112 through terminals fuse 114 and 115 to thereby turn on MOSFET 111.

When MOSFET 111 is thus turned on, fusible element 108 effectively short circuits cell 101 thereby providing a sufficient amount of current through fusible element 108 to activate the fusible element, as indicated at state 226, thereby disconnecting positive terminal 109 of cell 101 from positive output terminal 102. It is to be understood, that fusible element 108 could instead be an electromagnetically actuated circuit breaker, thermal fuse element or any other device or element which open circuits upon application of a sufficient potential across such device or element. Such a device or element can be positioned anywhere in the series path from positive (+) terminal 102 to negative (-) terminal 103. The device or element may or may not be user or factory resettable. Once fusible element 108 is open, cell 101 is effectively protected from further overcharge, notwithstanding the connection of a charger to output terminals 102 and 103, and notwithstanding the state of any signal at any of terminals 117, 134, 114, 147, 157 or 129.

A significant advantage of circuit 100 of FIG. 1 is that the circuit relies upon the power stored in cell 101 not only to power logic circuit 104, but to also activate fusible element 108. This arrangement relies upon the fact that an overcharged cell, at least until ruptured, is in fact charged and is capable of providing power to a load, the load in this case being the circuitry included within the package leadframe and the combination of MOSFET 111 and fusible element 108. This arrangement thus eliminates reliance upon an external power source to both monitor the potential across cell 101 and to prevent further overcharging.

When $V_{cell}$=$V_{safe}$, cell 101 will not explode, but will, if mechanically punctured, release tremendous amounts of energy. Therefore, to another embodiment of the invention, as long as logic circuit 104 provides a signal to gate 112 through fuse terminals 114 and 115 to thereby turn on MOSFET 111, such signal can also be used to activate a discharge circuit to discharge cell 101. If such signal were latched, the discharge circuit would completely discharge cell 101. A suitable circuit for such a discharge is explained further herein with respect to FIG. 6.

Referring again to FIG. 2, from any state as indicated at 230, when the potential at V+ terminal 117 is less than 1 volt or the potential at enable terminal 125 is less than that at V+ terminal 117 as indicated in transition 232, MOSFETs 105 and 106 are switched off as indicated at state 234. Expressed differently, state 234 is reached when the enable terminal 125 is in a low state, such as the case when battery pack 100 is detached from a load or a charger. State 234 is also reached when the potential across cell 101, $V_{cell}$, is too low to power logic circuit 104.

Figure 3:
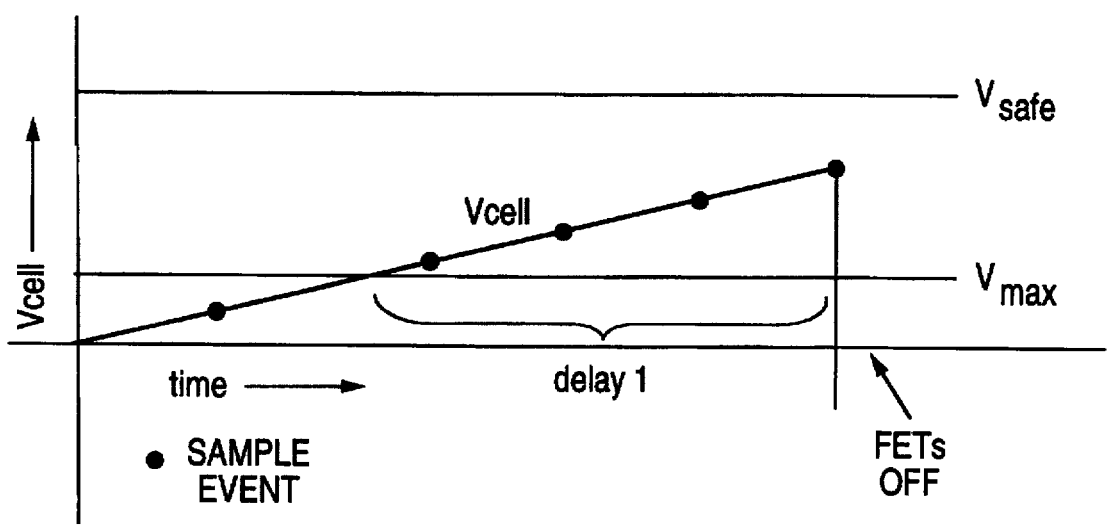
FIG. 3 is a graph which illustrates the operation of the embodiment of FIG. 1.
Figure 4:
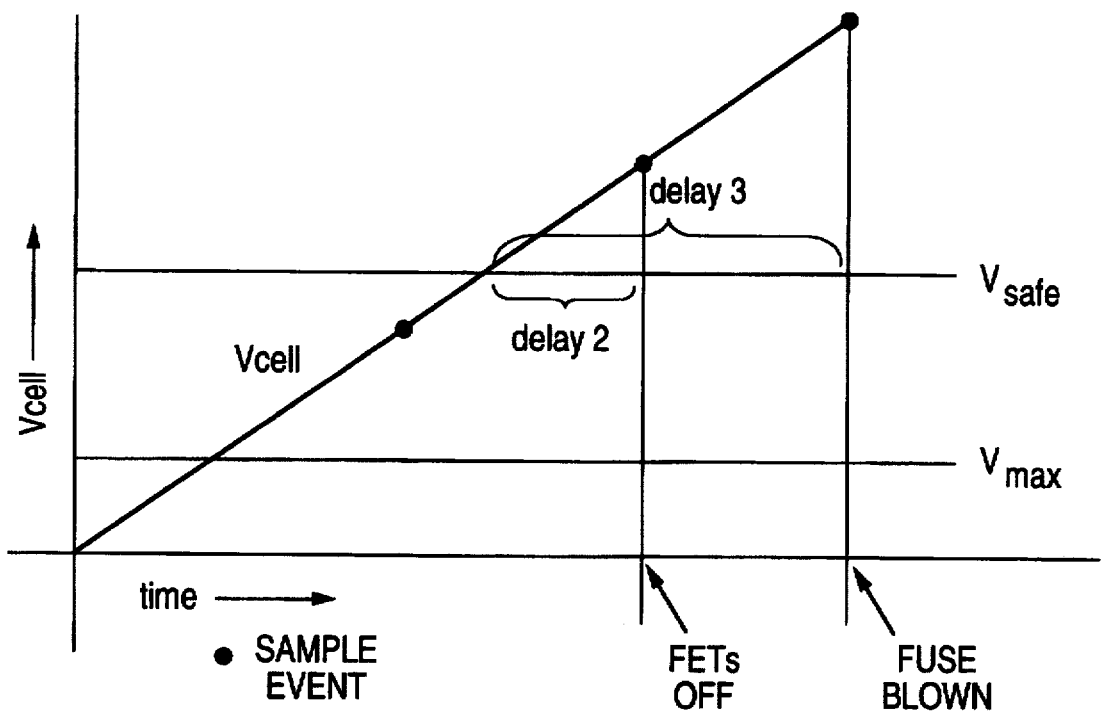
FIG. 4 is a graph which further illustrates the operation of the embodiment of FIG. 1.

Referring now to FIGS. 3 and 4, states 218 and 226 are explained in greater detail. In FIG. 3, the value of $V_{max}$ is set to be an essentially constant maximum value. The symbol • in each of FIGS. 3 and 4 represents a sample event. When the value of $V_{cell}$ first reaches that of $V_{max}$, logic circuit 104 continues to sample $V_{cell}$ at a frequency of 1 Hz. The time between the first crossing and the fourth sample is represented by the period indicated as "delay 1." Delay 1 corresponds to the period represented by transition 216 of FIG. 2. If at the fourth sample the value of $V_{cell}$ still exceeds the value of $V_{max}$, logic circuit 104 through gate terminal 147 turns off MOSFETs 105 and 106 as in state 218 of FIG. 2.

In FIG. 4, it is evident that $V_{safe}$ is greater in value than $V_{max}$. When the value $V_{cell}$ is first determined to exceed the value of $V_{safe}$, after a period of time "delay 2" (transition 222 of FIG. 2) logic circuit 104 turns off MOSFETs 105 and 106 by discontinuing the gate bias provided at gate terminals 147 and 148 (state 218 of FIG. 2). If the value of $V_{cell}$ continues to exceed $V_{safe}$, as would be the case if MOSFET 105 were essentially short circuited (since a body diode (not shown) of MOSFET 106 would conduct to some extent), when a second consecutive sample indicated that $V_{cell}$ was greater than $V_{safe}$ (transition 224 of FIG. 2), logic circuit 104 would then provide a bias at gate 112 to thereby cause the energy stored in cell 101 to activate fusible element 108 since MOSFET 111 would essentially short circuit fusible element 108 across cell 101. This sequence would effectively disconnect positive terminal 109 of cell 101 from the rest of the circuitry within battery pack 100, thereby preventing any further charging, overcharging or external discharge of cell 101. "Delay 3" in FIG. 4 corresponds to the sum of the periods represented by transitions 222 and 224 of FIG. 2. Although the preferred embodiment of the invention activates fusible element 108 when a second consecutive sample indicates that $V_{cell}$ is greater than $V_{safe}$, fusible element 108 may instead be activated when a second, third or subsequent sample indicates that $V_{cell}$ is greater than $V_{safe}$.

Figure 5:
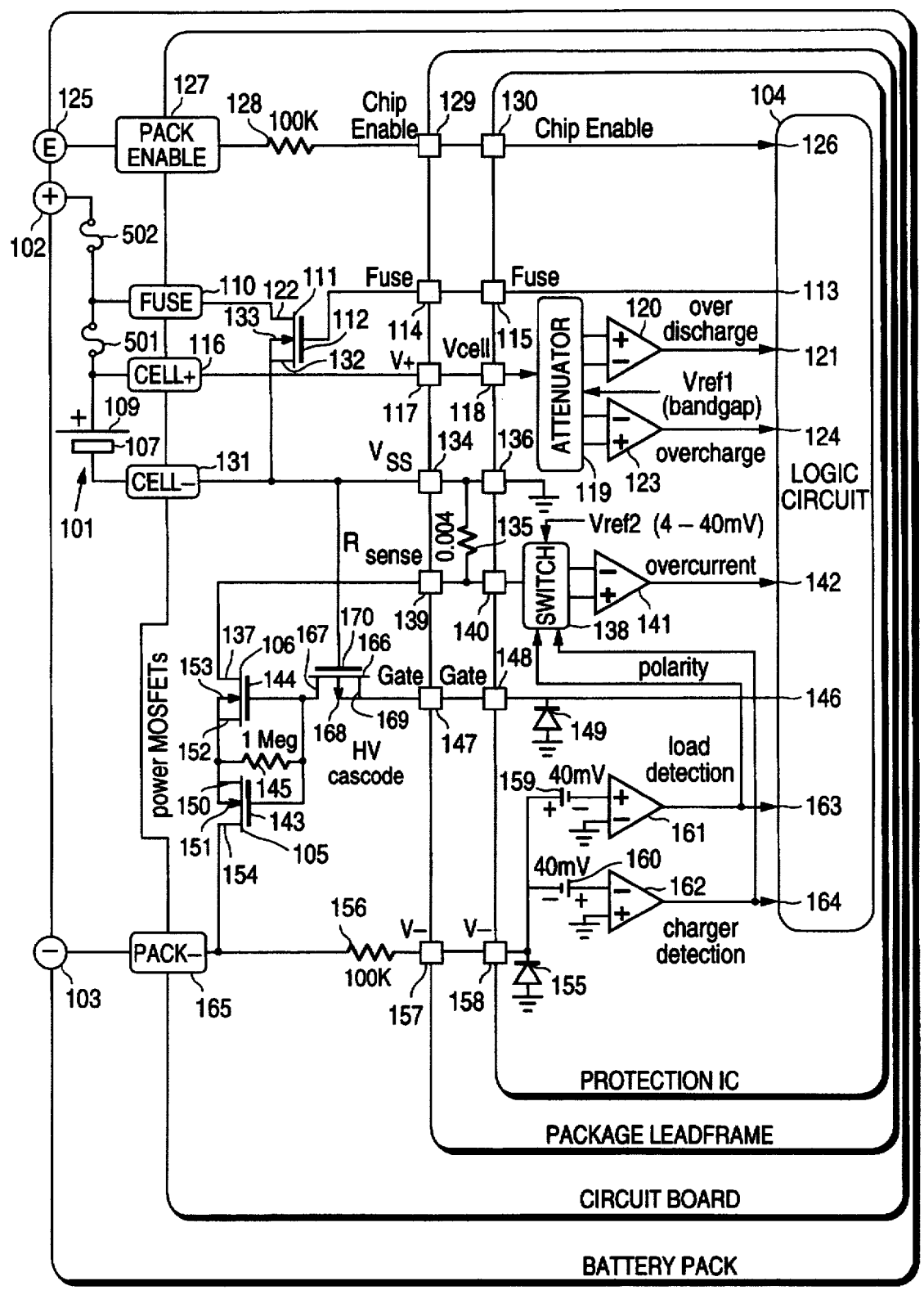
FIG. 5 is a block and schematic diagram of a second embodiment of the present invention.

Referring now to FIG. 5, an alternative embodiment 500 of the invention is shown. This alternative embodiment utilizes a fusible element 501 and a fusible element 502, where fusible element 502 is coupled between fusible element 501 and output terminal 102. With reference to FIG. 1, in the event the amount of current, $I_{chg}$, from an illegal charger is extremely large in comparison to the usual $I_{chg}$ from a legal charger, there is a finite possibility that such current could prevent MOSFET 111 from conducting sufficiently to activate or blow fusible element 108. Therefore, the embodiment of FIG. 5 includes fusible element 502. In the event the current $I_{chg}$ flowing through positive (+) terminal 102 exceeds a predetermined value, fusible element 502 is activated thereby isolating positive (+) terminal 102 from the rest of battery pack 500. It is to be understood that such predetermined value is used to determine the activation value (the current at which fusible element becomes non-conductive) of fusible element 502. In addition, such activation value is also selected to be greater than either any anticipated load current or any permissible charger current $I_{chg}$.

Figure 6:
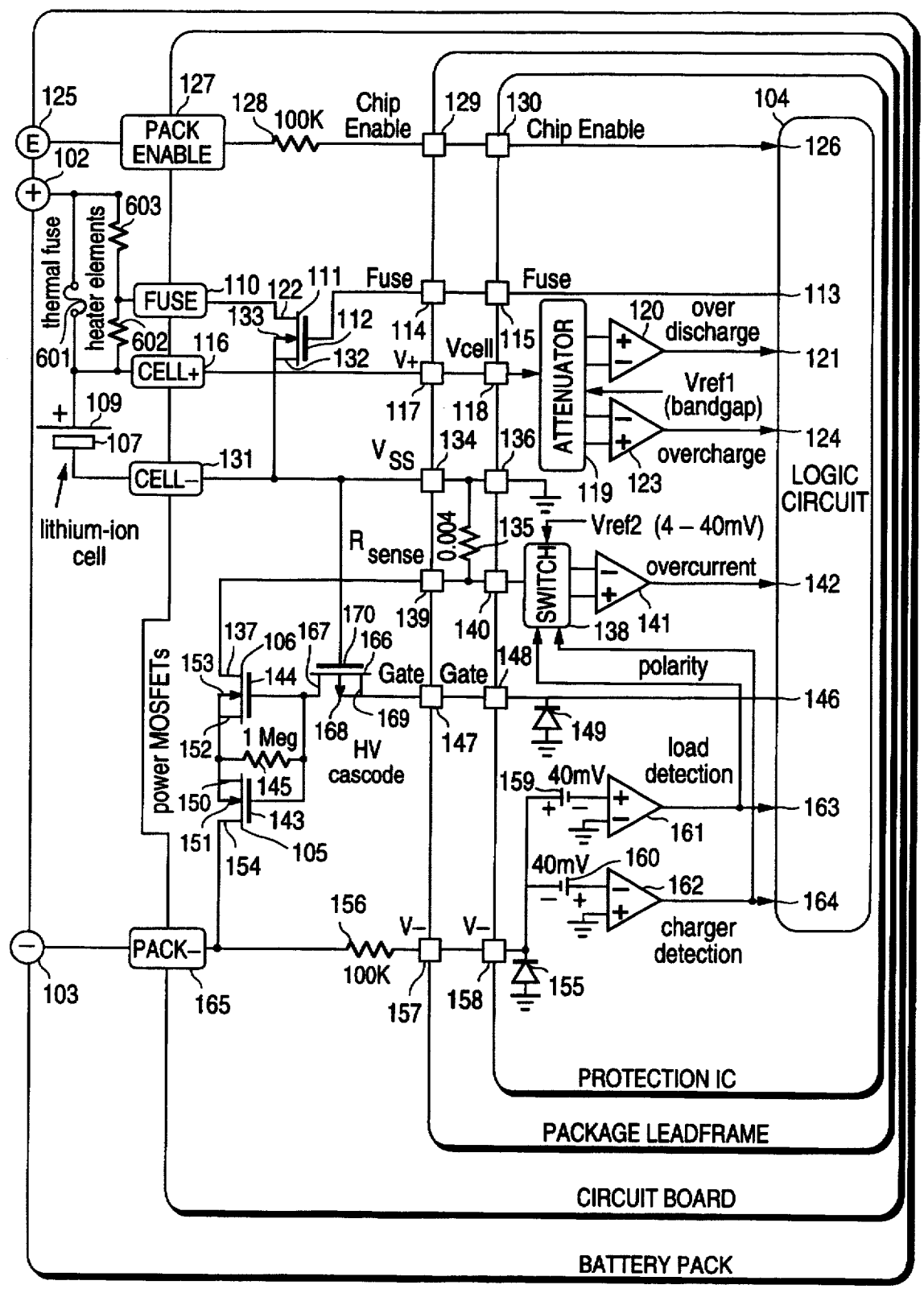
FIG. 6 is a block and schematic diagram of a third embodiment of the present invention.

Referring now to FIG. 6, yet another alternative embodiment 600 of the invention is shown. In FIG. 6 fusible element 108 of FIG. 1 has been replaced with a thermal fuse 601 (such as a wax ball type) which is activated by a pair of heaters 602 and 603.

In operation, upon a second or greater consecutive sample which indicates that $V_{cell}$ is greater than $V_{safe}$, as shown in transition 224 of FIG. 2, a signal is provided at fuse terminals 114 and 115 to gate 112 of MOSFET 111. This gate drive places MOSFET 111 in a conductive state thereby connecting the junction of heater elements 602 and 603 to negative terminal 107 of cell 101. Thus current from cell 101 flows from positive terminal 109, through heater element 602, through MOSFET 111 to negative terminal 107. Similarly, current from a charger flows from positive (+) terminal 102 through heater element 603, through MOSFET 111 to negative terminal 107. When sufficient heat from heaters 602 and 603 melt a thermally sensitive material (such as beeswax or paraffin) within thermal fuse 601, the conductive path within thermal fuse 601 opens and thereby disconnects output terminal 102 and any charger connected to such output terminal, from cell 101. In the case of the embodiment of FIG. 6, however, although thermal fuse 601 has been activated, current continues to flow through heater element 602 to thereby discharge cell 101. Such discharge continues until logic circuit 104 can no longer provide gate drive to gate 112 of MOSFET 111.

Figure 7:
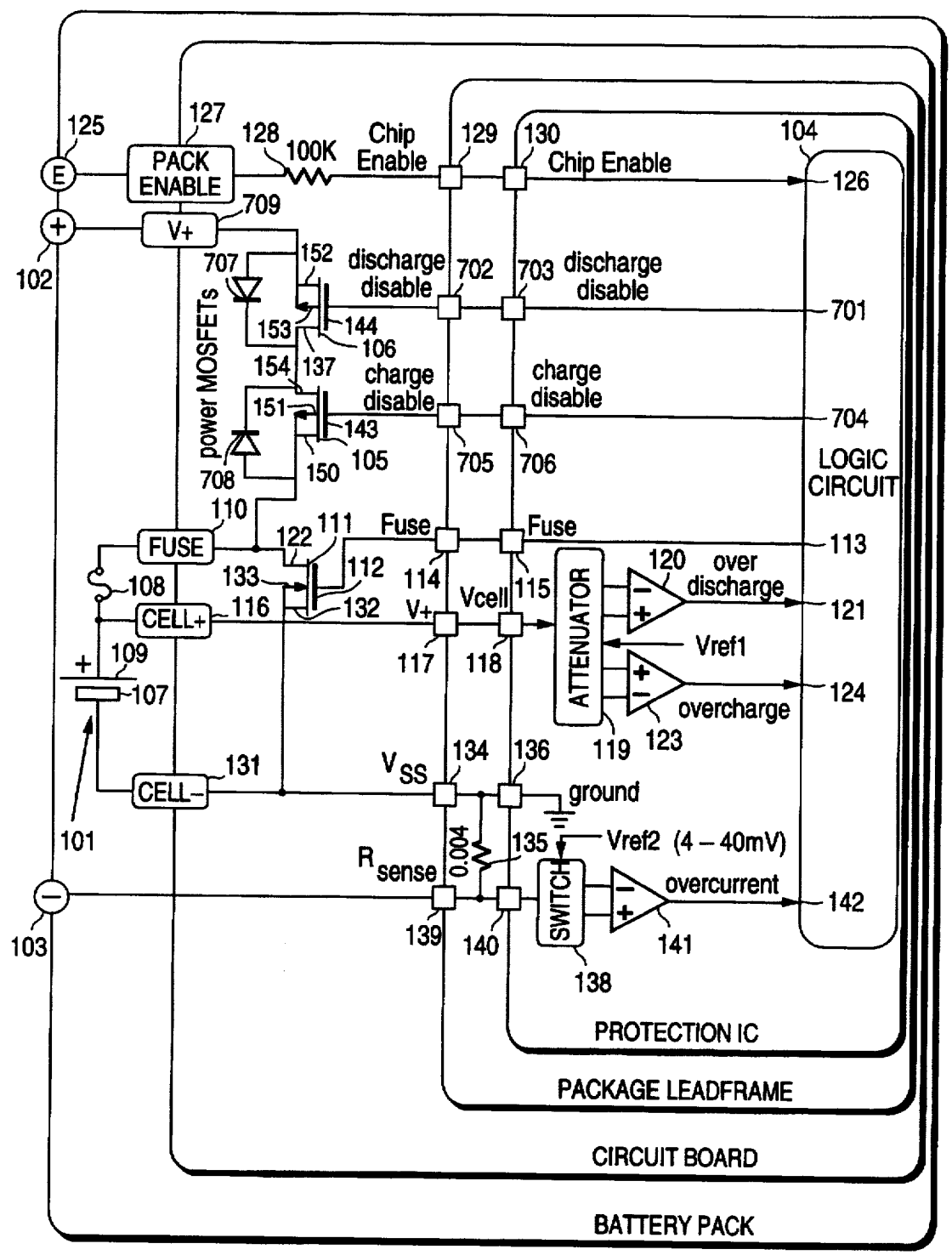
FIG. 7 is a block and schematic diagram of a fourth embodiment of present invention.

In contrast to the battery packs 100, 500 and 600 of FIGS. 1, 5 and 6, respectively, battery pack 700 of FIG. 7 utilizes a pair of drain-to-drain connected MOSFETs 105 and 106, which are placed on the high side of cell 101.

In addition, battery pack 700 utilizes separate gate drive signals to selectively render MOSFETs 105 and 106 into conduction or non-conduction. In further detail, when any of states 206, 212, or 234 are achieved, as detailed above and in FIG. 2, logic circuit 104 changes the drive provided to gate 144 through terminal 701 and discharge disable terminals 702 and 703 to thereby render MOSFET 106 non-conductive. Similarly, when any of states 212 or 234 are achieved, as detailed above and in FIG. 2, logic circuit 104 changes the drive provided to gate 143 through terminal 704 and charge disable terminals 705 and 706 to thereby render MOSFET 105 non-conductive. A diode 707 is has its cathode coupled to drain 154 and its anode coupled to source 150. A diode 708 has its cathode connected to drain 137 and its anode coupled to source 152. A V+ terminal 709 couples positive (+) terminal 102 to the junction of the anode of diode 707 and source 152 of MOSFET 106.

In operation, when a discharge disable signal (bias) is provided to gate 144 of MOSFET 106, diode 707, because of its unidirectional characteristics, allows charging of cell 101, but does not permit discharge of cell 101 through positive (+) terminal 102. When a charge disable signal (bias) is provided to gate 143 of MOSFET 105, diode 708, because of its unidirectional characteristics, allows discharge of cell 101, but does not permit charging of cell 101. A discharge disable signal is provided when attenuator 119 and comparator 120 determine an over discharge condition and in turn provide an over discharge signal to logic circuit 104. Similarly, a charge disable signal is provided when attenuator 119 and comparator 123 determine an overcharge condition and in turn provide an overcharge signal to logic circuit 104.

Figure 8:
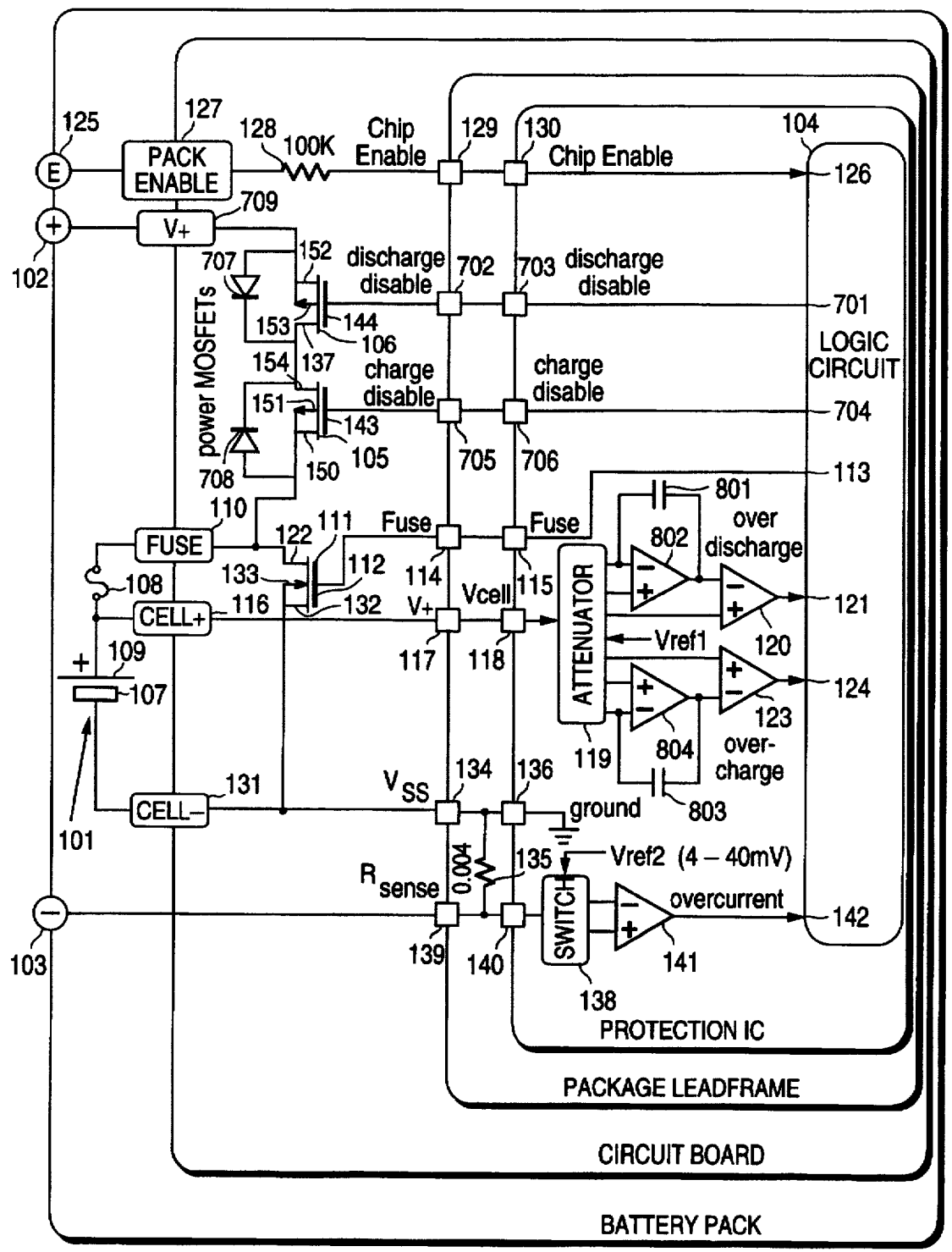
FIG. 8 is a block and schematic diagram of a fifth embodiment of the present invention.

With reference now to FIG. 8, a battery pack 800 which relies upon integration of $V_{cell}$ is shown. In the battery pack 800, a capacitor 801 is coupled between the inverting input and the output of an amplifier 802. The output of amplifier 802 drives the inverting input of comparator 120. Similarly, a capacitor 803 is coupled between the inverting input and the output of an amplifier 804. The output of amplifier 804 drives the inverting input of comparator 123. With such arrangements, amplifiers 802 and 804, each of which is driven by outputs of attenuator 119, each operate as a time averager, or as more commonly referred, as integrators.

In operation, if the potential across cell 101 exceeds a specified threshold voltage, a time integration of the excess voltage is performed and when the integration value exceeds a predetermined value, cell 101 is determined to be overcharged. As shown in FIG. 8, the potential across cell 101 is attenuated by attenuator 119. Amplifiers 802 and 804 each integrate the voltage excursions outside of minimum and maximum values, respectively for cell 101. Amplifiers 802 and 804, operating as integrators, determine if the integration of such excursion exceeds a specified value. The non-inverting inputs of amplifiers 802 and 804 are provided, through attenuator 119, an appropriate attenuated value of the reference value, $V_{refl}$.

Thus, the use of such integration overcomes problems associated with transients which may occur as a result of the characteristics of a load or the current characteristics of a charger.

Figure 9:
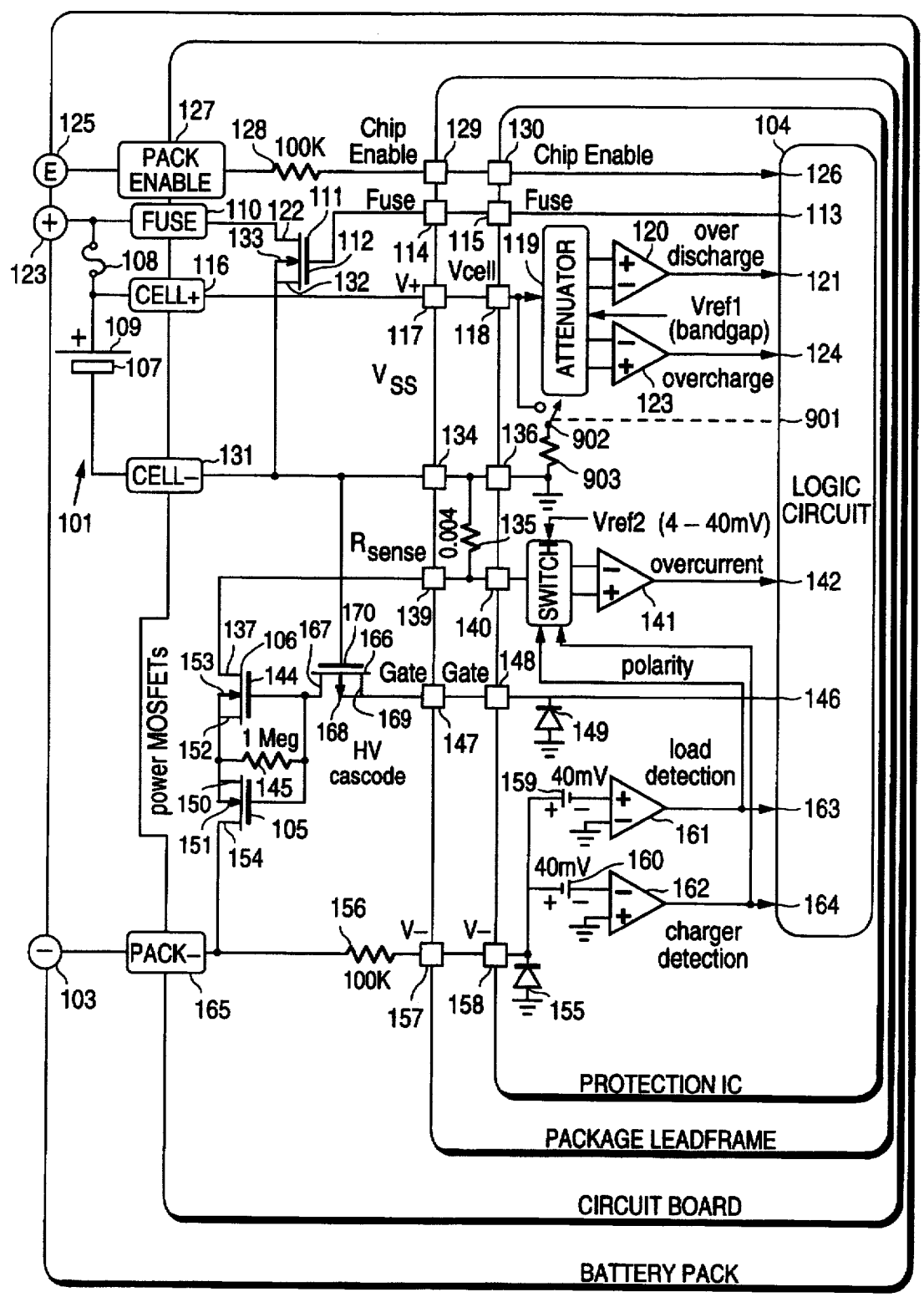
FIG. 9 is a block and schematic diagram of a sixth embodiment of the present invention.

Referring now to FIG. 9, a battery pack 900 which includes a cell discharge circuit within the protection IC is shown. In further detail, when a signal to gate 112 is provided through fuse terminals 114 and 115 to thereby turn on MOSFET 111, a logic circuit output 901 provides drive to close a switch 902 (represented here as a single pole, single throw switch). This in turn couples positive V terminal 109 to negative terminal 107 through a resistor 903 to thereby discharging cell 101 when fusible element 108 is activated. It is to be understood that although switch 902 is shown as a single pole, single throw switch, a solid state switch, using for example, the arrangement shown for MOSFET 112, may be utilized to couple resistor 903 across the positive and negative terminals, 109 and 107, respectively, of cell 101.

The following component values are recommended for an operative embodiment of the invention.

| REFERENCE NUMERAL | TYPE | VALUE |
| --- | --- | --- |
| 128 | resistor | 100K ohm |
| 135 | resistor | 0.004 ohm |
| 145 | resistor | 1 MEG ohm |
| 801 | capacitor | 2 pF |
| 802 | capacitor | 2 pF |
| 903 | resistor | 5K ohm |

Although only certain embodiments have been described in detail, those having ordinary skill in the art will certainly understand that many modifications are possible without departing from the teachings thereof. All such modifications are intended to be encompassed within the following claims.

I claim:

1. A method of protecting at least one rechargeable battery cell from overcharge, comprising the steps of:

monitoring a potential across the at least one rechargeable battery cell, and if the potential exceeds a predetermined value for at least a predetermined period, decoupling the at least one rechargeable battery cell from one of a plurality of output nodes, one output node coupled to a first polarity terminal of the rechargeable battery cell and another output node coupled to a second polarity terminal of the rechargeable battery cell; and monitoring the potential across the at least one rechargeable battery cell, and if the potential continues to exceed the predetermined value, further decoupling the at least one rechargeable battery cell from one of the plurality of output nodes.

2. The method of claim 1, wherein the steps of monitoring each comprise the step of:

sampling.

3. The method of claim 1, wherein the steps of monitoring each comprise the step of:

integrating a difference between the potential across the at least one rechargeable battery cell and the first predetermined value.

4. The method of claim 1, wherein the step of decoupling comprises the step of:

turning off a pair of MOSFETs connected in series between the at least one rechargeable battery cell and one of the plurality of output nodes.

5. The method of claim 1, wherein the step of further decoupling the at least one rechargeable battery cell comprises the step of:

activating a circuit-breaking element coupled in series between the at least one rechargeable battery cell and one of the plurality of output nodes.

6. The method of claim 1, wherein the step of further decoupling the at least one rechargeable battery cell further comprises the step of:

activating a circuit-breaking element coupled in series between the at least one rechargeable battery cell and another one of the plurality of output nodes.

7. The method of claim 5, wherein the circuit-breaking element comprises:

a fusible element.

8. The method of claim 6, wherein the circuit-breaking element comprises:

a fusible element.

9. The method of claim 5, wherein the circuit-breaking element comprises:

a circuit breaker.

10. The method of claim 6, wherein the circuit-breaking element comprises:

a circuit breaker.

11. The method of claim 5, wherein the circuit-breaking element comprises:

an external heat activated fusible element.

12. The method of claim 6, wherein the circuit-breaking element comprises:

an external heat activated fusible element.

13. The method of claim 5, wherein the step of activating a circuit breaking element, comprises the step of:

coupling the potential across the at least one rechargeable battery cell to the circuit-breaking element.

14. The method of claim 13, wherein the step of coupling comprises the step of:

biasing into conduction a transistor coupled between the at least one rechargeable battery cell and the circuit-breaking element.

15. The method of claim 6, wherein the step of activating a circuit breaking element, comprises the step of:

coupling the potential across the at least one rechargeable battery cell to the circuit-breaking element.

16. The method of claim 15, wherein the step of coupling comprises the step of:

biasing into conduction a transistor coupled between the at least one rechargeable battery cell and the circuit-breaking element.

17. The method of claim 1, further comprising the step of:

discharging the at least one rechargeable battery cell.

18. The method of claim 11, wherein the external heat activated fusible element comprises a thermal fuse and at least one heater element, further comprising the step of:

discharging the at least one rechargeable battery cell through the at least one heater element.

19. The method of claim 12, wherein the external heat activated fusible element comprises a thermal fuse and at least one heater element, further comprising the step of:

discharging the at least one rechargeable battery cell through the at least one heater element.

20. The method of claim 11, wherein the external heat activated fusible element comprises a thermal fuse and two heater elements, further comprising the step of:

discharging the at least one rechargeable battery cell through one of the heater elements.

21. The method of claim 12, wherein the external heat activated fusible element comprises a thermal fuse and two heater elements, further comprising the step of:

discharging the at least one rechargeable battery cell through one of the heater elements.

22. A method of protecting at least one rechargeable battery cell from overcharge, comprising the steps of:

monitoring a potential across the at least one rechargeable battery cell, and if the potential exceeds a predetermined value for at least a first predetermined period, decoupling the at least one rechargeable battery cell from one of a plurality of output nodes, one output node coupled to a first polarity terminal of the rechargeable battery cell and another output node coupled to a second polarity terminal of the rechargeable battery cell; and monitoring the potential across the at least one rechargeable battery cell, and if the potential continues to exceed the predetermined value for at least a second predetermined period, further decoupling the at least one rechargeable battery cell from one of the plurality of output nodes.

23. The method of claim 1, further comprising the step of:

discharging the at least one rechargeable battery cell through a resistance.

24. An apparatus for protecting at least one rechargeable battery cell from overcharge, comprising:

a comparator for monitoring a potential across the at least one rechargeable battery cell;

a logic circuit responsive to an output of the comparator for biasing into non-conduction at least one switching element coupled between the at least one rechargeable battery cell and one of a plurality of output nodes if the potential across the at least one rechargeable battery cell exceeds a predetermined value for a predetermined period; and a decoupling circuit driven by the logic circuit for decoupling the at least one rechargeable battery cell from at least one of the output nodes if the potential across the at least one rechargeable battery cell continues to exceed the predetermined value.

25. The apparatus of claim 24, wherein the logic circuit samples.

26. The apparatus of claim 24, wherein the switching element comprises:

a pair of MOSFETs connected in series between the at least one rechargeable battery cell and one of the plurality of output nodes.

27. An apparatus for protecting at least one rechargeable battery cell from overcharge, comprising:

an integrator for integrating a difference between a potential across the at least one rechargeable battery cell and a first predetermined value;

a logic circuit responsive to an output of the integrator for biasing into non-conduction at least one switching element coupled between the at least one rechargeable battery cell and one of a plurality of output nodes if the integrated difference exceeds a second predetermined value for at least a first predetermined period; and a decoupling circuit driven by the logic circuit for decoupling the at least one rechargeable battery cell from at least one of the output nodes if the integrated difference continues to exceed the second predetermined value.

28. The apparatus of claim 24, wherein the decoupling circuit comprises:

a circuit-breaking element coupled in series between the at least one rechargeable battery cell and one of the plurality of output nodes.

29. The apparatus of claim 24, wherein the decoupling circuit comprises:

a circuit-breaking element coupled in series coupled in series between the at least one rechargeable battery cell and another one of the plurality of output nodes.

30. The apparatus of claim 27, wherein the decoupling circuit comprises:

a circuit-breaking element coupled in series between the at least one rechargeable battery cell and one of the plurality of output nodes.

31. The apparatus of claim 27, wherein the decoupling circuit comprises:

a circuit-breaking element coupled in series coupled in series between the at least one rechargeable battery cell and another one of the plurality of output nodes.

32. The apparatus of claim 28, wherein the circuit-breaking element comprises:

a fusible element.

33. The apparatus of claim 29, wherein the circuit-breaking element comprises:

a fusible element.

34. The apparatus of claim 30, wherein the circuit-breaking element comprises:

a fusible element.

35. The apparatus of claim 31, wherein the circuit-breaking element comprises:

a fusible element.

36. The apparatus of claim 28, wherein the circuit-breaking element comprises:

an external heat activated fusible element.

37. The apparatus of claim 29, wherein the circuit-breaking element comprises:

an external heat activated fusible element.

38. The apparatus of claim 30, wherein the circuit-breaking element comprises:

an external heat activated fusible element.

39. The apparatus of claim 31, wherein the circuit-breaking element comprises:

an external heat activated fusible element.

40. The apparatus of claim 28, wherein the circuit-breaking element comprises:

a circuit breaker.

41. The apparatus of claim 29, wherein the circuit-breaking element comprises:

a circuit breaker.

42. The apparatus of claim 30 wherein the circuit-breaking element comprises:

a circuit breaker.

43. The apparatus of claim 31, wherein the circuit-breaking element comprises:

a circuit breaker.

44. The apparatus of claim 28, further comprising:

a transistor operative to couple the potential across the at least one rechargeable battery cell to the circuit-breaking element.

45. The apparatus of claim 29, further comprising:

a transistor operative to couple the potential across the at least one rechargeable battery cell to the circuit-breaking element.

46. The apparatus of claim 30, further comprising:

a transistor operative to couple the potential across the at least one rechargeable battery cell to the circuit-breaking element.

47. The apparatus of claim 31, further comprising:

a transistor operative to couple the potential across the at least one rechargeable battery cell to the circuit-breaking element.

48. The apparatus of claim 24, wherein the decoupling circuit is a first decoupling circuit, further comprising:

a second decoupling circuit coupled between the first decoupling circuit and one and of the plurality of output nodes.

49. The apparatus of claim 48, wherein the second decoupling circuit comprises:

a fusible element.

50. The apparatus of claim 27, wherein the decoupling circuit is a first decoupling circuit, further comprising:

a second decoupling circuit coupled between the first decoupling circuit and one and of the plurality of output nodes.

51. The apparatus of claim 51, wherein the second decoupling circuit comprises:

a fusible element.

52. The apparatus of claim 24, further comprising:

a resistance for discharging the at least one rechargeable battery cell after the further decoupling by the decoupling circuit.

53. The apparatus of claim 27, further comprising:

a resistance for discharging the at least one rechargeable battery cell after the decoupling by the decoupling circuit.

* * * * *

UNITED STATES PATENT AND TRADEMARK OFFICE
CERTIFICATE OF CORRECTION

PATENT NO. : 5,703,463
DATED : DECEMBER 30, 1997
INVENTOR(S) : Gregory J. Smith

It is certified that error appears in the above-identified patent and that said Letters Patent is hereby corrected as shown below:

In Col. 14, lines 11 and 12, delete the first occurrence of "coupled in series".

In Col. 16, line 1, delete "claim 51," and replace with --claim 50,--.

Signed and Sealed this

Twenty-fourth Day of March, 1998

Attest:

BRUCE LEHMAN

Attesting Officer

Commissioner of Patents and Trademarks